US009635681B2

(12) United States Patent
Accongiagioco et al.

(10) Patent No.: US 9,635,681 B2
(45) Date of Patent: Apr. 25, 2017

(54) SCHEDULING ALGORITHM FOR WIRELESS COMMUNICATION NETWORKS

(75) Inventors: Giovanni Accongiagioco, Crotone (IT); Matteo Maria Andreozzi, Pisa (IT); Marco Caretti, Turin (IT); Roberto Fantini, Turin (IT); Daniele Migliorini, Pisa (IT); Dario Sabella, Turin (IT); Giovanni Stea, Pisa (IT)

(73) Assignee: TELECOM ITALIA S.p.A., Milan (IT)

( * ) Notice: Subject to any disclaimer, the term of this patent is extended or adjusted under 35 U.S.C. 154(b) by 156 days.

(21) Appl. No.: 14/368,392

(22) PCT Filed: Dec. 29, 2011

(86) PCT No.: PCT/EP2011/074266
§ 371 (c)(1),
(2), (4) Date: Jun. 24, 2014

(87) PCT Pub. No.: WO2013/097904
PCT Pub. Date: Jul. 4, 2013

(65) Prior Publication Data
US 2014/0355540 A1 Dec. 4, 2014

(51) Int. Cl.
*H04W 72/12* (2009.01)
*H04L 25/02* (2006.01)

(52) U.S. Cl.
CPC ..... *H04W 72/1231* (2013.01); *H04L 25/0258* (2013.01); *H04W 72/1226* (2013.01)

(58) Field of Classification Search
None
See application file for complete search history.

(56) References Cited

U.S. PATENT DOCUMENTS 6,963,753 B1 * 11/2005 Hamabe ............... H04B 7/022
370/278
2009/0296595 A1 12/2009 Khoshnevis et al.
(Continued)

FOREIGN PATENT DOCUMENTS

WO 2008/103979 8/2008
WO 2011/085817 7/2011

OTHER PUBLICATIONS

Tian Lan; Kaustubh Sinkar; Latha Kant; Kenneth Kerpez, Resource Allocation and Performance Study for LTE Networks Integrated with Femtocells, 2010 IEEE , 1-6.*
(Continued)

*Primary Examiner* — Noel Beharry
*Assistant Examiner* — Wilfred Thomas
(74) *Attorney, Agent, or Firm* — Oblon, McClelland, Maier & Neustadt, L.L.P.

(57) ABSTRACT

A method scheduling resources allocation within a wireless communications network including at least one network cell including a central unit providing coverage over the network cell and managing at least one transmission frame for putting the central unit into communication with at least one user equipment. The method includes: retrieving input parameters including, for each user equipment, a channel quality parameter indicating a measured/estimated channel quality based on actual network cell conditions; applying a de-contextualization function to each channel quality parameter for obtaining a corresponding atomic channel quality parameter indicating channel quality de-contextualized from the actual network cell conditions; performing a scheduling algorithm providing a binary allocation matrix indicating each scheduled physical resource block, transmission frame and user equipment; and applying a contextualization function to the allocation matrix obtaining transport block size data usable by the scheduled transmission (Continued)

Figure 1:
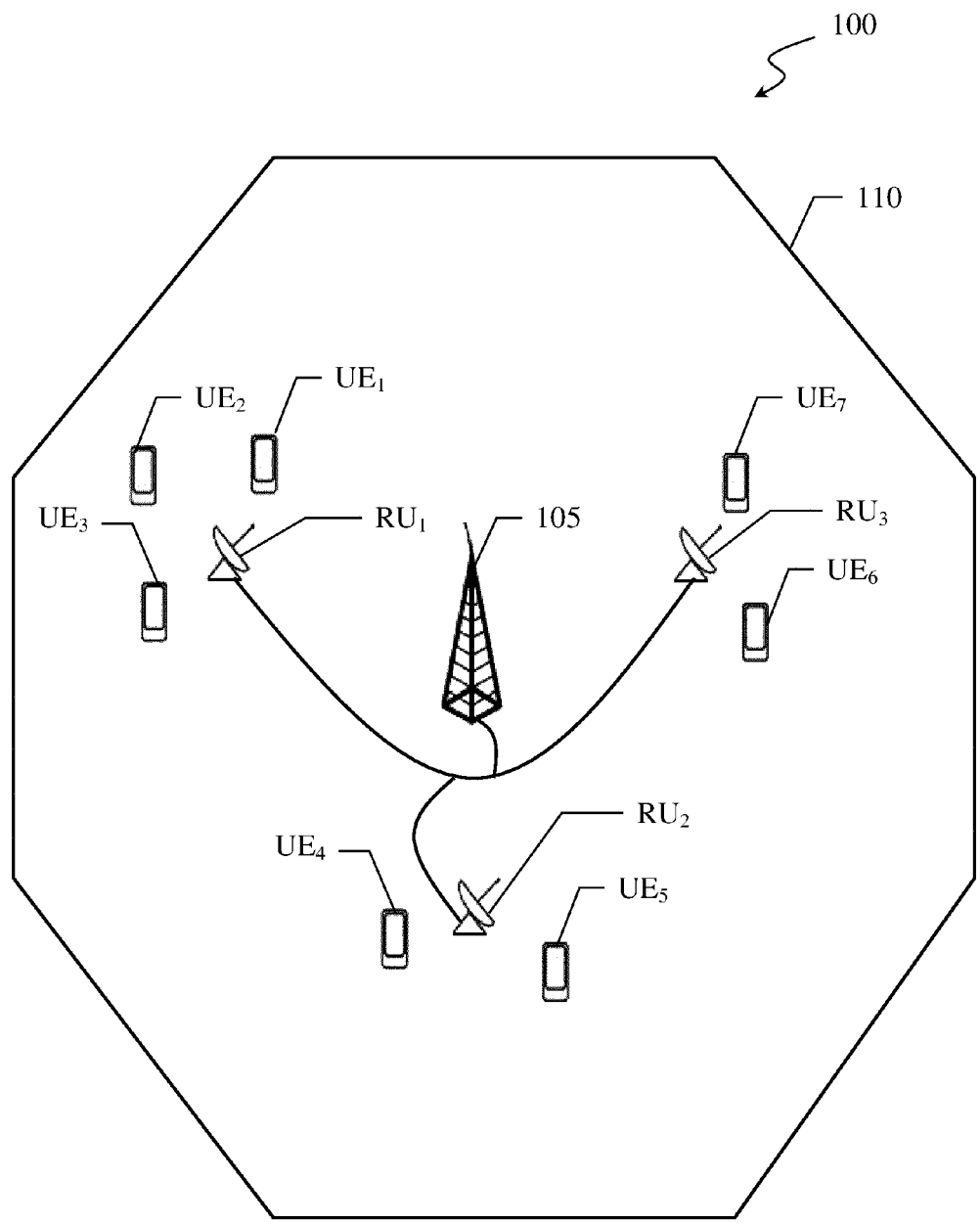

frame for transport blocks transmissions from or towards each scheduled user equipment.

16 Claims, 4 Drawing Sheets

(56) References Cited

U.S. PATENT DOCUMENTS

| | | |
|---|---|---|
| 2010/0195614 A1 | 8/2010 | Nimbalker et al. |
| 2010/0306613 A1 | 12/2010 | Wu et al. |
| 2011/0090808 A1 | 4/2011 | Chen et al. |
| 2011/0170642 A1 | 7/2011 | Wang et al. |

OTHER PUBLICATIONS

3GPP TSG-RAN WG1 #57bis, R1-092310 ,"Comparison of CSI Feedback Schemes", Alcatel-Lucent, (retrieved on Jun. 24, 2009), XP050350842.

International Search Report issued Aug. 10, 2012, in PCT/EP12/074266, filed Dec. 29, 2011.

Written Opinion of the International Searching Authority issued Aug. 10, 2012, in PCT/EP12/074266, filed Dec. 29, 2011.

* cited by examiner

SCHEDULING ALGORITHM FOR WIRELESS COMMUNICATION NETWORKS

BACKGROUND OF THE INVENTION

Field of the Invention

The present invention generally relates to wireless communications networks, such as cellular networks. More particularly, the present invention relates to resources allocation on wireless communication networks, such as OFDMA wideband wireless communication networks making use of a Distributed Antenna System through Frequency Domain Packet Scheduling.

Overview of the Related Art

Evolution of wideband wireless communication networks has experienced a significant growth in terms of spread and performance, and has recently brought to new-generation cellular systems (generally referred to as fourth generation or 4G cellular wireless systems), such as WiMAX ("Worldwide Interoperability for Microwave Access")—i.e. a communication technology for wirelessly delivering high-speed Internet service to large geographical areas, LTE ("Long Term Evolution") and LTE-Advanced, which are designed to meet needs for high-speed data and media transport as well as high-quality voice and video communications support into the next decade.

As known, such new-generation cellular systems make use of some advanced techniques, such as OFDM ("Orthogonal Frequency Division Multiplex") signal transmission scheme—based on using multiple sub-carriers closely-spaced in the frequency domain such that adjacent sub-carriers are orthogonal to each other, and the associated OFDMA "Orthogonal Frequency-Division Multiple Access" access scheme, relying on the use of the OFDM signal transmission scheme and according to which individual (or groups of) sub-carriers (i.e. elementary resource allocations, generally referred to as "Physical Resource Blocks") are assigned, based on scheduling decisions, to different users, so as to support differentiated Quality of Service (QoS), i.e. to control data rate and error probability individually for each user.

An extension of such OFDMA-based wireless communication networks is to consider the implementation thereof within Distributed Antenna Systems, which, originally introduced to simply cover dead spots in indoor wireless communications networks, have been recently identified as providing potential advantages in outdoor wireless communications networks (to such an extent that many cellular service providers and/or system manufacturers may also consider replacing legacy cellular systems with distributed antenna systems or adopting them in the forthcoming 4G wireless communications networks).

Each Distributed Antenna System (in the following DAS system or DAS, for the sake of conciseness) substantially comprises a network of spatially separated radio-transmitting remote units—e.g. antennas—covering a corresponding geographic area, and a common central unit (or eNodeB), for accomplishing processing and managing operations, to which each remote unit is connected through a proper transport medium (e.g. optical fibers, dedicated wires, or exclusive radio-frequency links). Each remote unit is configured for receiving a digital base-band signal from the central unit, and, after digital to analog conversion, filtering and amplifying operations, for transmitting the corresponding radio-frequency signal to user equipments (e.g., user terminals, such as cellular phones) of subscribers/users requiring services in the same network cell (e.g., voice call).

In this way, being the radio-frequency signal to be transmitted by the central unit radiated by several remote units located remote from the central unit, better defined cell coverage and extended cell coverage (thus, fewer coverage holes), simplified maintenance (as DAS system can reduce the required number of central units within a target service area) and higher signal-to-interference-plus-noise ratio (SINR) are obtained with respect to a non DAS system.

Presently, a number of works are known wherein solutions providing for scheduling schemes are disclosed.

In Ping Gong, Ke Yu, Yumei Wang, "*Radio resource allocation for multiuser OFDMA distributed antenna systems*", IEEE International Conference on Network Infrastructure and Digital Content, 2009, the authors face the problem of assigning transmitting power and logic sub-bands to a plurality of users served in DAS modality, in downlink direction. The problem of allocation is formulated as problem of mixed integer-linear optimization, and heuristic algorithms are calculated that approximate the optimum solution.

In Joonil Choi, Illsoo Sohn, Sungjin Kim and Kwang Bok Lee, "*Efficient Uplink User Selection Algorithm in Distributed Antenna Systems*", IEEE 18th International Symposium on Personal, Indoor and Mobile Radio Communications, 2007, the authors describe a scheme for assigning users to antennas.

In W. Xu, Z. He, K. Niu, "*Opportunistic Packet Scheduling in OFDM Distributed Antenna Systems*", WiCOM'09 Proceedings of the 5$^{th}$ International Conference on Wireless communications, networking and mobile computing, 2009, the authors investigate an OFDM system with distributed antennas for allocating power and sub-bands in such a way to minimize packet losses.

In B. Yang, Y. Tang, "*Heuristic Resource Allocation for Multiuser OFDM Distributed Antenna System with Fairness Constraints*", Proceedings of ICCTA 2009, the authors face the problem of maximizing the amount of traffic transmitted under some constraints in an OFDM system with DAS. In this respect, the authors propose heuristic algorithms for allocating sub-carriers to the users, with the constraints that an antenna can serve only one user on a sub-carrier and that each user has a predefined granted minimum rate.

In Lisha Ling, Tan Wang, Ying Wang, Cong Shi, "*Schemes of Power Allocation and Antenna Port Selection in OFDM Distributed Antenna Systems*", Vehicular Technology Conference Fall (VTC 2010-Fall), 2010 IEEE 72$^{nd}$, the authors propose a power allocation and antenna port selection heuristic algorithm on OFDM-DAS systems.

In Marsch P., Khattak S., Fettweis G., "*A Framework for Determining Realistic Capacity Bounds for Distributed Antenna Systems*", Information Theory Workshop, 2006. ITW '06 Chengdu. IEEE, the authors propose a framework for evaluation of uplink capacity bounds of DAS systems through link-level simulations.

In Jun Zhang, Andrews J., "*Distributed Antenna Systems with Randomness Wireless Communications*", IEEE Transactions, 2008, the authors evaluate performance, by simulating a realistic channel, of single-cell and multi-cell DAS systems by comparing two known transmitting techniques (i.e. MRT, or "Maximum Ratio Transmission", and ST, or "Selection Transmission"), verifying that the single-cell MRT technique provides better performance whereas the multi-cell ST technique provides lower outage probability. Moreover, the authors study how the geometric or random arrangements of the remote units affect the system performance.

In Zhu, H., Karachontzitis, S., Toumpakaris, D., "Low-complexity resource allocation and its application to distributed antenna systems", Wireless Communications, IEEE 2010, the authors evaluate, through link-level simulations, performance increase in case of resource allocation based on frequency chunk (logical band) in single-cell systems and DAS systems, by comparing two known transmitting techniques (i.e. MRT, or "Maximum Ratio Transmission", and ZFB, or "Zero Forcing Beamforming").

In Peng Shang, Guangxi Zhu, Li Tan, Gang Su, Tan Li, "Transmit Antenna Selection for the distributed MIMO Systems", 2009 International Conference on Networks Security, Wireless Communications and Trusted Computing, the authors face the problem of the selection of the transmitting antenna as a two-level optimization problem: the first level selects the cluster of antennas for the service of a determined user, whereas the second level selects which antennas of the cluster are to be used for the user.

In Alexei Gorokhov, Dhananjay A. Gore, and Arogyaswami J. Paulraj, "Receive Antenna Selection for MIMO Spatial Multiplexing: Theory and Algorithms", IEEE TRANSACTIONS ON SIGNAL PROCESSING, VOL. 51, NO. 11, NOVEMBER 2003, the authors illustrate different algorithms, described for MIMO systems and applicable to DAS systems, for the selection of the receiving antennas in the uplink direction.

SUMMARY OF INVENTION

The Applicant has recognized that none of the above-referenced works discloses scheduling algorithms for concurrent activation of different remote units and concurrent allocation of same available time-frequency resources to the different activated remote units (thereby allowing the use of spatial multiplexing techniques), while taking into account throughput maximization (herein intended as maximization of the average rate of successful data or data packets delivery over a communication channel) and mutual interference among the activated remote units.

Moreover, the Applicant has identified that in Ping Gong, Ke Yu, Yumei Wang work each user is assumed to be connected to a single remote unit, to receive only one data stream (thereby disallowing the use of spatial multiplexing techniques based on multiple remote units), and to occupy exclusively a whole logic sub-band, whereas neither finite size of the user buffers nor allocation criterion aimed to obtain maximum throughput are considered. Furthermore, in the referenced work the entity that manage the scheduling is assumed to know physical parameters (e.g., noise power on each logic sub-band), which actually are not reported by the users in LTE-Advanced.

Instead, as far as Joonil Choi, Illsoo Sohn, Sungjin Kim and Kwang Bok Lee work and Alexei Gorokhov, Dhananjay A. Gore, and Arogyaswami J. Paulraj work are concerned, according to the Applicant the described algorithms do not allow allocation of resources to users, but simply establish a user-antenna connection based on features of the physical layer (thus prescinding from the concept of frame or amount of data the user has to transmit).

The Applicant has also found that in W. Xu, Z. He, K. Niu work the overall power is allocated to the antenna having maximum gain (thus no reference to concurrent selection of multiple antennas is made), similarly to Lisha Ling, Tan Wang, Ying Wang, Cong Shi work, wherein power maximization is achieved by selecting the best antenna for each user (thus, without considering spatial multiplexing and interference issues), and to B. Yang, Y. Tang work, wherein the user having rate closest to a required minimum rate is selected and associated with the antenna and the sub-carrier having maximum gain (regardless of buffer status of the selected user in terms of amount of data within it).

Moreover, the Applicant has identified that in Peng Shang, Guangxi Zhu, Li Tan, Gang Su, Tan Li work the possibility of spatial multiplexing is not considered, as well as finite size of the buffers. Moreover, in the referenced work the service choice is based exclusively on features of the physical layer not explicitly reported by users in LTE-Advanced.

As mentioned above, many cellular service providers and/or system manufacturers may consider adopting DAS systems in the forthcoming 4G wireless communications networks, such as LTE-Advanced, thus the Applicant has tackled the problem of devising a solution suitable to provide a new simple and effective scheduling procedure for concurrent activation of different remote units and concurrent allocation of same available physical resource blocks to the different concurrently activated remote units, while considering throughput maximization and mutual interference among the activated remote units.

In doing so, the Applicant has paid particular attention to develop a scheduling procedure that can be easily adapted to further implementations of the wireless communication networks that, although not necessarily provided with DAS systems, are to be considered as being affected by the same common issue as scheduling concurrent activation of different remote units for concurrent resource allocation thereon. For example, another possible key enhancement feature of LTE-Advanced may be bandwidth extension via carrier aggregation to support deployment bandwidth up to 100 MHz, which could allow achieving peak target data rates higher than 1 Gbps in the downlink and 500 Mbps in the uplink. Attractiveness of carrier aggregation comes from the fact that it allows operators/providers to deploy a system by aggregating several smaller contiguous or non-contiguous carriers while providing backward compatibility to legacy users. In fact, since LTE-Advanced has to provide spectrum compatibility to legacy users, support for wider bandwidth in LTE-Advanced can be provided through aggregation of multiple carriers, wherein each carrier may appear as LTE carrier to legacy users while LTE-Advanced users would be able to transmit and receive on several carriers simultaneously (and according to one of the three possible aggregation scenarios, namely "Intra-band Contiguous", "Intra-band Non-Contiguous" and "Inter-band Non-Contiguous").

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, the solution according to one or more embodiments of the present invention relates to a method for scheduling resources allocation within a wireless communications network comprising at least one network cell, the at least one network cell comprising a central unit providing coverage over the network cell and managing at least one transmission frame for putting into communication the central unit with at least one corresponding user equipment within the network cell. The method comprises retrieving input parameters, said input parameters comprising, for each user equipment, a channel quality parameter indicative of a measured/estimated channel quality based on actual network cell conditions;

applying a de-contextualization function to each channel quality parameter for obtaining a corresponding atomic channel quality parameter indicative of the channel quality de-contextualized from the actual network cell conditions;

performing a scheduling algorithm for providing a binary allocation matrix indicative of each scheduled physical resource block, transmission frame and user equipment, and applying a contextualization function to said allocation matrix for obtaining indication of transport block size to be used by the scheduled transmission frame for transport blocks transmissions from or towards each scheduled user equipment.

In an embodiment of the invention, said performing a scheduling algorithm may comprise reiterating the scheduling algorithm until all the atomic channel quality parameters have been zeroed, and said scheduling algorithm may comprise, for each iteration:

for each user equipment, masking the atomic channel quality parameters by a current buffer status variable indicative of the current status of the user equipment buffer;

scheduling the user equipment, transmission frame and physical resource block whose masked atomic channel quality parameter has maximum value;

upon each scheduling, updating the allocation matrix by setting the element of the allocation matrix corresponding to the scheduled user equipment, transmission frame and physical resource block at a first value indicative of the scheduling;

updating the current buffer status variable of the scheduled user equipment according to said scheduling;

zeroing the atomic channel quality parameters related to the scheduled transmission frame for the scheduled physical resource block, and updating each atomic channel quality parameter different from zero corresponding to the scheduled physical resource block.

Preferably, although not necessarily, said masking the atomic channel quality parameters comprises replacing each atomic channel quality parameter by the minimum value between the atomic channel quality parameter itself and the current buffer status variable.

In a further, not limiting embodiment of the invention, said performing a scheduling algorithm may comprise iterating the scheduling algorithm until all the atomic channel quality parameters have been zeroed, and said scheduling algorithm may comprise, for each iteration:

selecting a user equipment, transmission frame, physical resource block whose atomic channel quality parameter is different from zero;

for each selected user equipment, updating a current buffer status variable indicative of the current status of the selected user equipment buffer;

scheduling the user equipment, remote unit and physical resource block whose current buffer status variable has minimum value;

upon each scheduling, updating the allocation matrix by setting the element of the allocation matrix corresponding to the scheduled user equipment, transmission frame and physical resource block at a first value indicative of the scheduling;

zeroing the atomic channel quality parameters related to the scheduled transmission frame for the scheduled physical resource block, and updating each atomic channel quality parameter different from zero corresponding to the scheduled physical resource block.

Advantageously, said updating each atomic channel quality parameter different from zero corresponding to the scheduled physical resource block comprises applying to it a penalization factor indicative of the interference that would occur if the transmission frame of the current scheduling decision was transmitted, and penalizing each atomic channel quality parameter different from zero by means of the determined penalization factor.

The input parameters may further comprise a buffer size parameter indicative of an amount of data that is buffered for each user equipment, and said updating the current buffer status variable may comprise decreasing each value of the current buffer status variable, initially set at the buffer size parameter, by actual amount of data already served to the corresponding user equipment buffer, with said actual amount of data that takes into account mutual interference among the transmission frames by means of the respective penalization factor.

The input parameters may further comprise a number of active transmission frames for each user equipment. In this respect, the method may further comprise after said updating the allocation matrix, updating the number of active transmission frames for the scheduled user equipment, and after said zeroing the atomic channel quality parameters related to the scheduled transmission frame for the scheduled physical resource block, zeroing all the atomic channel quality parameters related to the scheduled user equipment in case the corresponding number of active transmission frames is zero.

According to a non-limiting embodiment, the contextualization function is zero when no mutual interference between the transmission frames is present, constant when each transmission frame is supposed to induce a constant interference factor to all the other transmission frames, and proximity-based when each transmission frame is supposed to induce a constant interference factor to the neighboring transmission frames.

In the uplink case, said channel quality parameter is an uplink channel quality parameter denoting the uplink channel quality evaluated in respect of the at least one user equipment and by the central unit in respect of the transmission frame, whereas said buffer status parameter is an uplink buffer status parameter comprised, together with the uplink channel quality parameter, with a buffer status report available at the remote unit. In the downlink case, said channel quality parameter is a feedback downlink channel quality parameter denoting the downlink channel quality evaluated by each user equipment, whereas said buffer status parameter is a downlink buffer status parameter.

Another aspect of the solution according to an embodiment of the present invention relates to a computer program loadable into at least one internal memory of a computer system with input units and output units as well as with processing units, the computer program comprising executable software adapted to carry out the method phases of above, alone or in combination, when running in the computer system.

A further aspect of the solution according to embodiments of the present invention relates to a wireless communications network comprising at least one network cell, the at least one network cell comprising a central unit providing coverage over the network cell and managing at least one transmission frame for putting into communication the central unit with at least one corresponding user equipment within the network cell. The base station comprises a scheduler unit for retrieving input parameters, said input parameters comprising, for each user equipment, a channel quality parameter indicative of a measured/estimated channel quality based on actual network cell conditions;

applying a de-contextualization function to each channel quality parameter for obtaining a corresponding atomic channel quality parameter indicative of the channel quality de-contextualized from the actual network cell conditions;

performing a scheduling algorithm for providing a binary allocation matrix indicative of each scheduled physical resource block, transmission frame and user equipment, and applying a contextualization function to said allocation matrix for obtaining indication of transport block size to be used by the scheduled transmission frame for transport blocks transmissions from or towards each scheduled user equipment.

Without departing from the scope of the invention, the wireless communications may a cellular communication network compliant with Long Term Evolution (LTE) Advanced standard adopting Single Carrier Frequency Division Multiple Access scheme for uplink transmission and Orthogonal Frequency Division Multiplexing Modulation Access scheme for downlink transmission, LTE or Wi-max standards.

The wireless communications network may further comprise at least one remote unit implementing a distributed antenna system for physically transmitting the at least one transmission frame, each remote unit of the distributed antenna system being coupled with the central unit through a transport medium comprising optical fibers, dedicated wires, and/or exclusive radio-frequency links, and being coupleable with each user equipment concurrently by radio links.

Additionally or alternatively, each transmission frame may be transmitted on a separate frequency band through carrier aggregation approach.

Thanks to the present invention, available physical resource blocks are allocated to a set of concurrently activated remote units such as to have maximum throughput and minimal interference (due to concurrent activation of multiple remote units on the same time-frequency resources). Hence, the proposed procedure is able to use spatial multiplexing technique, thereby profiting by advantages of frequency selective scheduling. Moreover, although the present invention will be described with reference to wireless communication networks provided with DAS systems, it may also be applied to other wireless communication networks configurations (also unprovided with DAS systems, such as those based on carrier aggregation) that can be demonstrated as having reference, in terms of general problem formulation, to the one herein exemplarily illustrated.

BRIEF DESCRIPTION OF THE ANNEXED DRAWINGS

Figure 2:
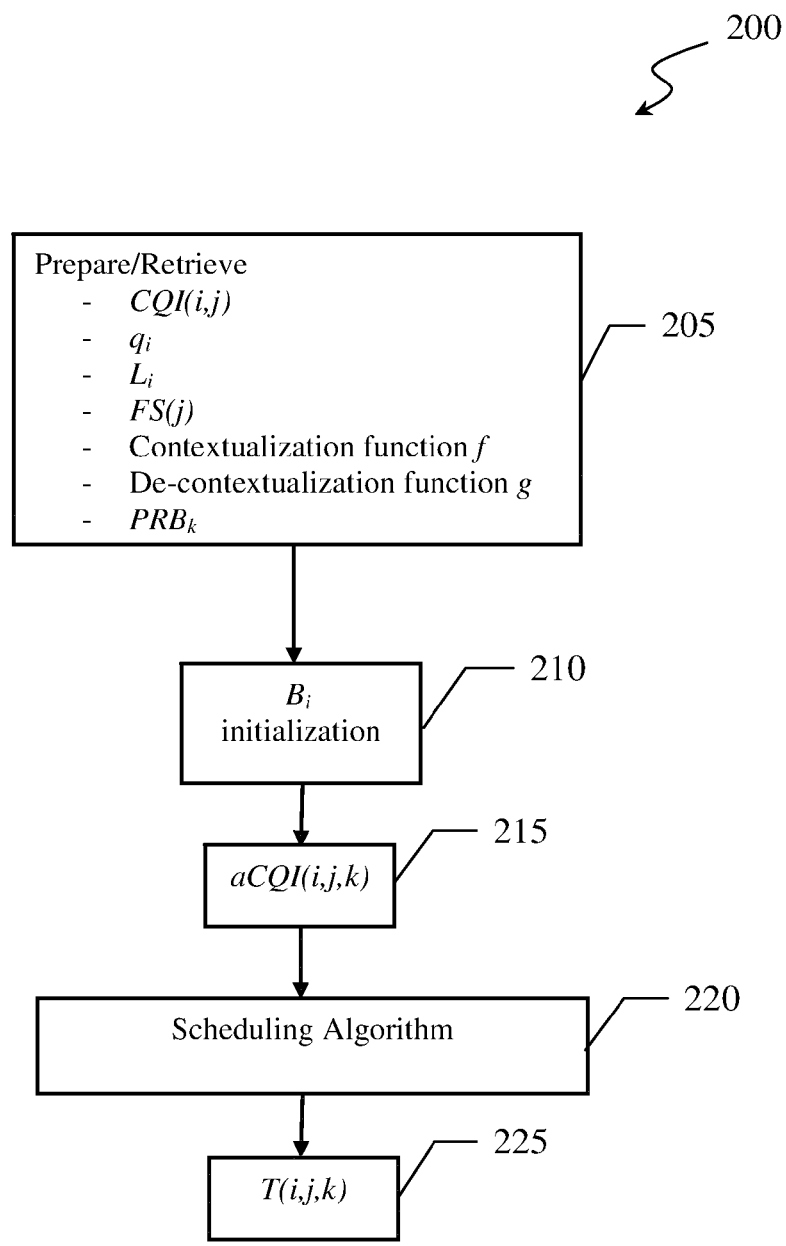
Figure 3:
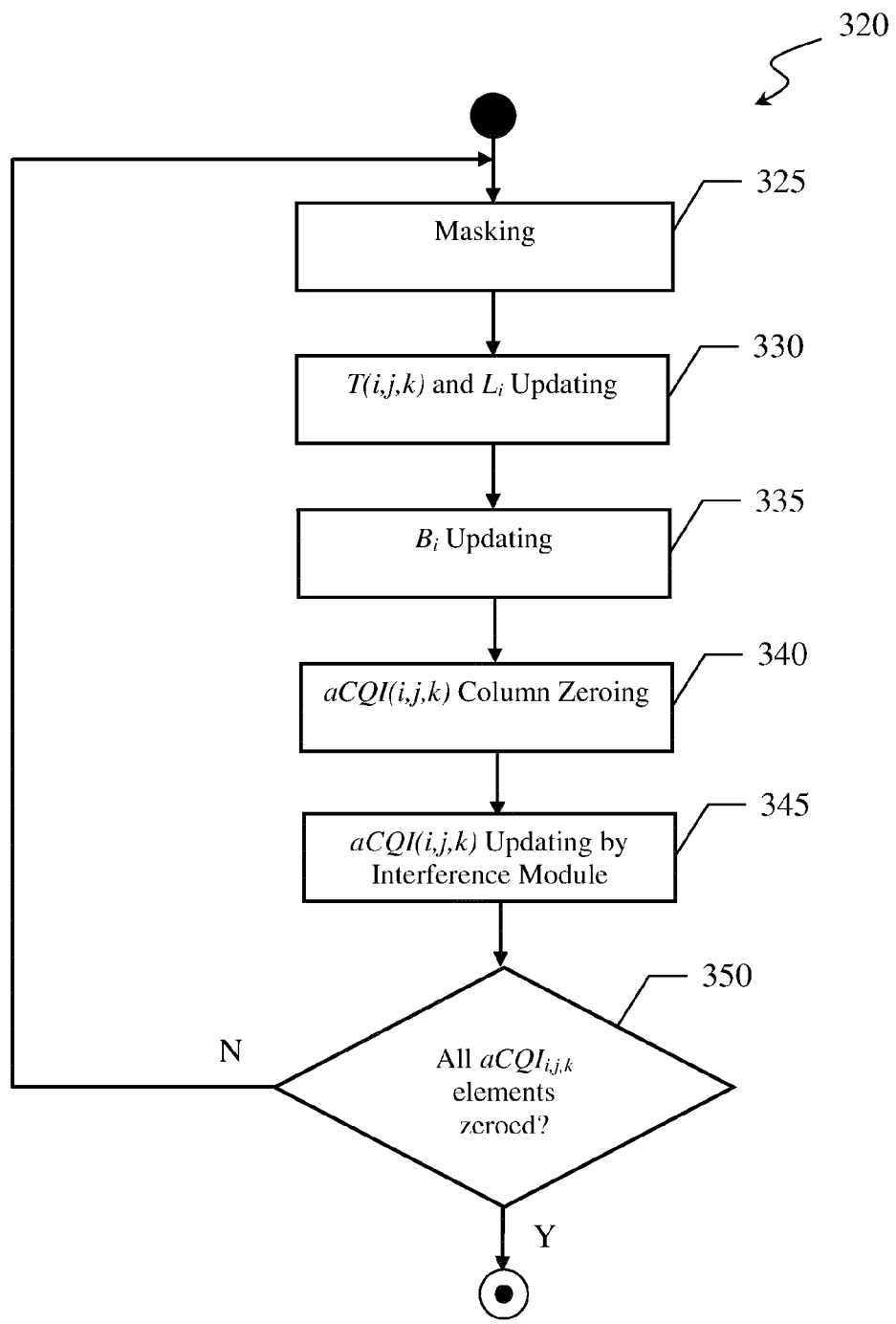
Figure 4:
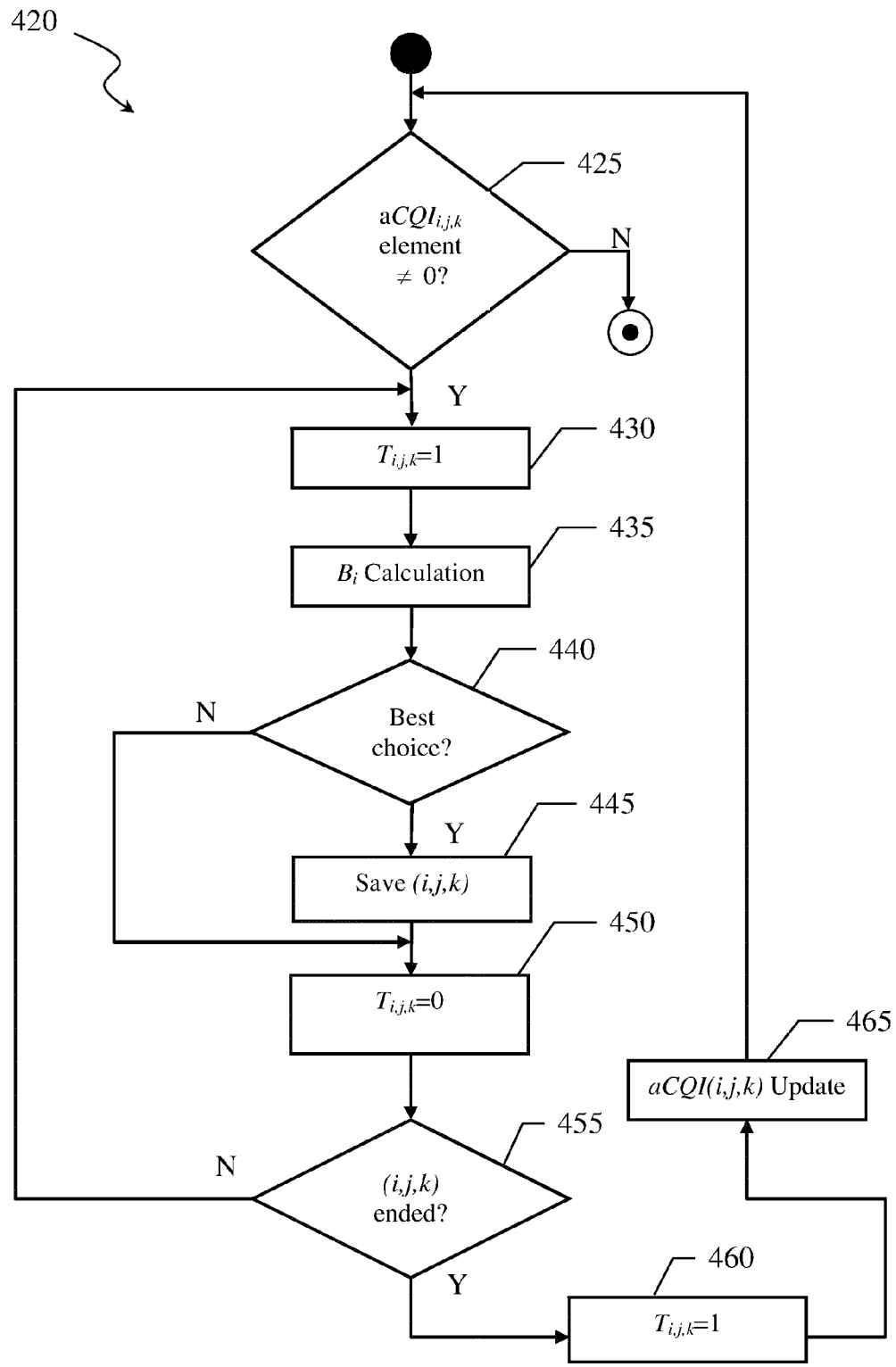

These and other features and advantages of the present invention will be made apparent by the following description of some exemplary and non limitative embodiments thereof; for its better intelligibility, the following description should be read making reference to the attached drawings, wherein:

FIG. 1 schematically shows a wireless communications network portion wherein the solution according to one or more embodiments of the present invention may be applied;

FIG. 2 schematically shows a high-level scheme of a scheduling procedure according to the principles of the present invention;

FIG. 3 schematically shows a flow chart illustrating a sequence of operations of a scheduling algorithm of the scheduling procedure according to an embodiment of the present invention, and FIG. 4 schematically shows a flow chart illustrating a sequence of operations of a scheduling algorithm of the scheduling procedure according to another embodiment of the present invention.

DETAILED DESCRIPTION OF PREFERRED EMBODIMENTS OF THE INVENTION

With particular reference to the figures, FIG. 1 shows a (portion of a) wireless communications network 100 wherein the solution according to one or more embodiments of the present invention may be applied. The wireless communication network 100 may comprise a plurality of fixed-location Central Units (CUs), such as the CU 105, which in general accomplishes to processing and managing, e.g. scheduling operations (as will be better discussed in the following); one or more CUs, such as the CU 105, provide for (radio/cable) coverage over a geographic area, also referred to as network cell, such as the (e.g. hexagonal-shaped) network cell 110, for allowing each i-th User Equipment (in the following UE or $UE_i$, with i=1, 2, . . . N, N=7 in the example at issue) within the network cell (such as one among the $UE_i$s $UE_1$-$UE_7$—e.g., mobile phone—within the network cell 110) to receive a required service (e.g., a phone call). In the exemplary but not limiting embodiment described, the wireless communication network 100 is a cellular communication network (or briefly cellular network), compliant with the forthcoming Long Term Evolution (LTE) Advanced protocol standardized by the Third Generation Partnership Project (3GPP) Universal Mobile Telecommunications System (UMTS), wherein Single Carrier Frequency Division Multiple Access (SC-FDMA) scheme for uplink transmission (i.e., transmission path from the $UE_i$s) and Orthogonal Frequency Division Multiplexing Modulation Access (OFDMA) scheme for downlink transmission (i.e., transmission path towards the $UE_i$s) are used. As known, the OFDMA and the SC-FDMA schemes allow different number of sub-carriers to be assigned to different $UE_i$s, and hence supporting differentiated Quality of Service (QoS), i.e. controlling data rate and error probability individually for each $UE_i$.

As known, the CU 105 is generally configured for managing one or more transmission frames (i.e., data structures, containing both user data and control data, that form the signal to be radio-frequency transmitted) for putting into communication the CU 105 with one or more corresponding $UE_i$s within the network cell 110. In the exemplary, not limiting, embodiment visible in the figure, the cellular network 100 also comprises a number j=1, 2, . . . M (with M=3 in the disclosed example) of radio-transmitting Remote Units (RUs or $RU_j$s—e.g. antennas, as illustrated in the figure for the $RU_j$s $RU_1$-$RU_3$—which implement a Distributed Antenna System (or DAS system or DAS) generally configured for transmitting several independent transmission frames thereby making communication between the CU 105 and one, some, or all the $UE_i$s within the network cell 110 more efficient (however, as will be best described in the following, the principles of the present invention may be equivalently applied to a system, e.g. exploiting carrier aggregation approach, in which the transmission frames are mainly transmitted by the central unit, on predefined carriers, instead of the remote units). The $RU_j$s represent intermediate stations between the CU 105 and one or more $UE_i$s within the network cell 110 (e.g., by radiating the e.g. radio-frequency signal to be transmitted from the CU 105 to a selected $UE_i$ from different $RU_j$s), and are separated in space, i.e. distributed within the network cell 110 such as to provide coverage over the same geographical area (i.e. the network cell 110 itself) as a single RU does in a conventional implementation.

Advantageously, each $RU_j$ is connected to the CU 105 through a proper transport medium—e.g. optical fibers (as herein assumed and exemplarily illustrated by solid lines), dedicated wires, or exclusive radio-frequency links. Thus, according to well known principle of DAS systems, each $RU_j$ is configured for receiving a digital base-band signal from the CU 105, and, after carrying out proper digital to analog conversion, filtering and amplifying operations, for transmitting the corresponding radio-frequency signal to the $UE_i$s (hence, to subscribers/users) requiring services in the network cell 110.

For the sake of completeness, as well known by those having ordinary skill in the art, the CUs, such as the CU 105, are generally part of a Radio Access Network (not depicted), which is generally communicably coupled with a E-UTRAN ("Evolved-UMTS Terrestrial Radio Access Network", not shown), the latter in turn being typically coupled with other networks, such as Internet and/or public switched telephone networks (not illustrated).

According to an embodiment of the present invention, the CU 105 (typically, through a scheduler unit, or scheduler, thereof, not shown) is configured for implementing a scheduling procedure aimed to handle concurrent activation of different $RU_j$s for allocation of same radio resources thereto, while optimizing and maximizing network cell throughput through exploitation of parameters already available in LTE-Advanced standard, such as mutual interference among the activated $RU_j$s.

Turning now to FIG. 2, the latter schematically shows a high-level scheme of a scheduling procedure 200 according to the principles of the present invention.

As previously discussed, the object of the scheduling procedure 200 is throughput maximization of the network cell by properly and concurrently activating a set of $RU_j$s to which available physical radio resource blocks can be allocated with minimal mutual interference.

It should be understood that the term "radio resources" may have specific meaning according to the technology used for the cellular network (for example, the technology used for modulation and coding scheme for implementing transmissions over channels or links); for the cellular network herein exemplarily disclosed, such term should be generically construed as, and thus referred in the following as, radio "Physical Resource Blocks", i.e., groups of elementary resource allocations, such as transport carriers (e.g. sub-carriers), assigned by the CU scheduler for data transmission purposes (e.g., a physical resource block for LTE-Advanced may comprise a group of 12 sub-carriers when the sub-carrier bandwidth is 15 kHz or a group of 24 sub-carriers when the sub-carrier bandwidth is 7.5 kHz).

In the exemplary disclosed embodiment, the scheduling procedure 200 is run within the CU at each TTI ("Transmission Time Interval", i.e. the signal time on the air interface—e.g., 1 TTI=1 ms), and generally comprises a scheduling algorithm outputting an allocation matrix indicative of $UE_i$s-$RU_j$s allocation scheduling decisions (i.e., of each scheduled physical resource block, $RU_j$ and $UE_i$), and preliminary operations for allowing the scheduling decisions to be taken as correctly and reliably as possible (as will be described shortly).

In the exemplary disclosed embodiment, the scheduling procedure 200 prepares/retrieves (e.g. receives) input parameters (block 205) indicative of a status of the $UE_i$s within the network cell and that, according to the last release 10 LTE standard, come from the $UE_i$s—such as in case of downlink transmission, to which reference will be made hereinafter for the sake of description ease only—or are generated/estimated therefor (for instance by the CU or the $RU_j$s by any proper measurement/estimation method, e.g. RSSI measurement)—such as in case of uplink transmission. Advantageously, such input parameters comprise:

Channel Quality Indicator (or CQI(i,j)) parameter, also referred to as channel quality parameter in the following), i.e. a measure/estimation of communication channels quality of each $RU_j$ for communicating to each $UE_i$ making use of performance metric (such as signal-to-noise ratio (SNR), signal-to-interference plus noise ratio (SINR), and indicating a suitable data rate (typically a Modulation and Coding Scheme (MCS) value) for downlink transmissions. As known, such measure/estimation is conditioned by actual, current network cell conditions (e.g., signal interference among actually active $RU_j$s) during the measure/estimation. In the present, not limiting implementation, it will be assumed that CQI(i,j) as a whole comprises, resident in the CU, an array of possible, discrete CQI values (in the following, CQI_val) that can be assigned to the measures/estimations of communication channels quality (and expressed as the number of bytes allocable for each physical resource block), and, resident in each $UE_i$, a corresponding CQI indexes matrix (in the following, CQI_ind(i,j)) that each $UE_i$ report to the CU for communicating the position, within the array of CQI values, of the value CQI_val that best approximates the measure/estimation of the channels quality for all the $RU_j$s made by the considered $UE_i$.

$UE_i$s information, i.e. the information referring to each i-th $UE_i$ in terms of
buffer size parameter $q_i$, i.e. amount of data that is buffered at the CU for each i-th $UE_i$ for downlink (or at the $UE_i$ for uplink) transmissions (in the uplink, such parameter is made available to the CU by Buffer Status Reporting provided in both LTE and LTE-Advanced standards); and
spatial layer $L_i$, i.e. the number of active layers for each i-th $UE_i$ (it should be noted that, in case of carrier aggregation approach, the number of active transmission frames would be considered instead of the number of active layers).

Physical Resource Block (or $PRB_k$), i.e. each k-th group of elementary resource allocations, such as transport carriers (e.g. sub-carriers), assigned by CU scheduler for data transmission purposes to a $UE_i$.

Frame Size FS(j), i.e. the size, expressed in $PRB_k$s, of the frequency space that each j-th $RU_j$ has at disposal for signal transmission.

According to the present invention, the channel quality parameters are recognized to be "contextualized", i.e. the measure/estimation of the reported CQI(i,j)) parameters refer to the activation of a determined set of $RU_j$s, in the following active set, on a determined $PRB_k$.

In this respect, according to the present invention, the scheduling procedure 200 makes use of a proper de-contextualization function g, e.g. resident in the CU and defined as a function able to transform each CQI(i,j)) parameter measure/estimation computed for each i-th $UE_i$ (uplink case), or reported by the i-th $UE_i$ (downlink case), for a considered $RU_j$ in a corresponding "atomic" measure/estimation, i.e. a measure/estimation not conditioned, not correlated, i.e. de-contextualized, from the active set which the considered $RU_j$ belonged to during CQI(i,j)) parameter measurement/estimation, and a contextualization function $f$, e.g. resident in the CU as well and defined as a function able to modify the expected amount of bits for the k-th $PRB_k$ for each $UE_i$ according to the made scheduling decisions and specifically according to the active sets scheduled by the scheduler for each $UE_i$ (i.e., the contextualization function $f$ accomplishes a logically inverse operation with respect to the de-contextualization function g). As should be easily understood, the contextualization function $f$ and the de-contextualization function g are not limiting for the present invention, as they can be expressed by any mathematic formula or model according to specific and contingent criteria. By way of example only, the contextualization function $f$ may be:
- "Zero", indicating that the mutual interference between the RUs is zero;
- "Constant", indicating that each $RU_j$ is supposed to induce a constant interference to all the other $RU_j$s (e.g., interference factor equal to 1, meaning that the current CQI_ind of the de-contextualized CQI index matrix has to be decreased by 1, and the number of bytes for $PRB_k$ has to be accordingly estimated by using the array of values CQI_val in TBS);
- "Proximity-based", indicating that each $RU_j$ is supposed to induce a constant interference to the neighboring $RU_j$s only, and a null interference on the non-neighboring $RU_j$s.

Upon reception of the input parameters of above, the scheduling procedure 200 initializes (e.g., at the value of the buffer size parameter $q_i$) a current buffer status variable $B_i$ indicative of the current status of each UE buffer (block 210), and then computes an "Atomic CQI Matrix", hereinafter aCQI(i,j,k) matrix (block 215), i.e. a matrix of "atomic $aCQI_{i,j,k}$" elements, or $aCQI_{i,j,k}$ elements, obtained by applying to the $CQI_{i,j,k}$ elements (in turn derived from CQI_val array and CQI_ind(i,j) index table) the de-contextualization function g, and the information about the network cell features, and indicative of the channel quality de-contextualized from the active set according to which the feedback parameter had been calculated/estimated (e.g., the active set related to five previous executions of the scheduling procedure, 5 ms in the considered example).

In other words, the $aCQI_{i,j,k}$ elements of the aCQI(i,j,k) matrix represent the amount of bits that can be transmitted for each k-th $PRB_k$, i.e. the number of bits for each $PRB_k$ to be transmitted to each i-th $UE_i$ if only the j-th $RU_j$ should be active on the k-th $PRB_k$, thus the values of the $aCQI_{i,j,k}$ elements are not depending on the active set according to which they had been previously measured/estimated, as opposed to the $CQI_{i,j,k}$ elements (from which the $aCQI_{i,j,k}$ elements are derived) that are intrinsically conditioned by the determined allocation configuration of the activated set of $RU_j$s.

Then, at block 220, the scheduling procedure 200 performs a scheduling algorithm (described below) that reiterates until the aCQI(i,j,k) matrix is totally zeroed (i.e., all $aCQI_{i,j,k}$ elements thereof are zero), and provides (block 225) the scheduling decisions in terms of a binary allocation matrix T(i,j,k) indicative of the scheduled $UE_i$s, $RU_j$s and $PRB_k$s, i.e. of each k-th $PRB_k$ allocated for each j-th $RU_j$ towards each i-th $UE_i$, without any indication of transport block size to be used by the scheduled RU for transport blocks transmissions from or towards each scheduled $UE_i$ (information that instead will be provided by applying the contextualization function $f$ to the allocation matrix T(i,j,k)).

With reference to FIG. 3, it schematically shows a flow chart illustrating a sequence of operations of a scheduling algorithm 320 according to an embodiment of the present invention. The scheduling algorithm 320 starts at the black start circle, and then reaches the block 325, wherein the aCQI(i,j,k) matrix is "masked" by using current buffer status variable $B_i$ of the corresponding i-th $UE_i$s (e.g. by replacing, for each k-th $PRB_k$, each $aCQI_{i,j,k}$ element of the aCQI(i,j,k) matrix by the minimum between CQI_val[CQI_ind(i,j)] and $B_i$, thereby avoiding wasting radio resources as allocation of more radio resources than those requested to transmit all data of the i-th $UE_i$ buffer is prevented (i.e., there is no transmission capacity overestimation for the i-th $UE_i$), then the $aCQI_{i,j,k}$ element of the aCQI(i,j,k) matrix having maximum CQI_val is determined (thus, the i-th $UE_i$, j-th $RU_j$ and k-th $PRB_k$ whose corresponding masked $aCQI_{i,j,k}$ element has maximum value are scheduled).

At block 330 the scheduling algorithm 320 updates the allocation matrix T(i,j,k) (for example, by associating a "1" value for each scheduled $UE_i$, $RU_j$ and $PRB_k$) and, if necessary, also updates the number of layers $L_i$ in use for the i-th e.g. in case the latter had received services on at least one layer.

The scheduling algorithm 320 then updates (block 335) the current buffer status variable $B_i$ of all the i-th $UE_i$s; by way of example only, this can be achieved by decreasing the value of each current buffer status variable $B_i$ (e.g. initially set at the corresponding buffer size parameter $q_i$, see initialization step of above) by actual amount of data already served to the corresponding UE buffer, said actual amount of data taking into account possible mutual spatial interference among the $RU_j$s by means of a corresponding penalization factor.

Then, the column of the aCQI(i,j,k) matrix related to the j-th $RU_j$ on the k-th $PRB_k$ is zeroed and, if necessary (e.g. layers run out), the remaining of the row of the i-th $UE_i$ is zeroed as well (block 340).

At block 345 the scheduling algorithm 320 applies (by means of the contextualization function $f$) the interference model for updating the not-zeroed $aCQI_{i,j,k}$ elements of the aCQI(i,j,k) matrix that will be used for the following, new active set. In an embodiment of the present invention, this is achieved by determining a penalization factor P indicative of the interference that would occur if the j-th $RU_j$ of the active set determined by the current scheduling decision transmitted (or, equivalently, if the transmission frame was transmitted), and updating the current $aCQI_{i,j,k}$ elements by penalizing them (by means of the determined penalization factor P) taking into account both its own interference and the interference induced on the $RU_j$s activated before it (in other words, the penalization factor is indicative of the difference between the CQI(i,j) parameters of the previous reporting and the CQI(i,j) parameters that would be hypothetically calculated upon considering the active set determined by the current scheduling decision).

In this way, the updated $aCQI_{i,j,k}$ elements form a new, updated, current aCQI(i,j,k) matrix for a new $UE_i$, $RU_j$, $PRB_k$ scheduling, until all the possible $UE_i$s, $RU_j$s, $PRB_k$s to be scheduled have ended; as exemplarily illustrated in the figure, the scheduling algorithm 320 achieves this by checking at the decision block 350 whether all the $aCQI_{i,j,k}$ elements of the aCQI(i,j,k) matrix have been zeroed, denoting that all the possible $UE_i$s, $RU_j$s, $PRB_k$s have been examined, or not. In the affirmative case, exit branch Y of the decision block 350, the scheduling algorithm 320 ends to the double end black circle (and causes the scheduling procedure ending, as the latter provides the allocation matrix T(i,j,k) indicative of the allocation of all the k-th $PRB_k$s on (one or more) $RU_j$s towards (one or more) $UE_i$s), whereas in the negative case, exit branch N of the decision block 350, the scheduling algorithm 320 reiterates the steps above discussed of the blocks 325-350 until the all the $aCQI_{i,j,k}$ elements of the aCQI(i,j,k) matrix have been zeroed.

For the sake of completeness and clarity, in the following a practical, numeric operation example of the scheduling algorithm 320 will be proposed and briefly discussed. In this respect, let be considered the exemplary and not limiting scenario illustrated in the tables below, namely a "General Configuration" table comprising the number of involved $UE_i$s, the number of involved $RU_j$s, the number of considered $PRB_k$s and the number of layers $L_i$, the array of possible (e.g., discrete) values CQI_val, the index table CQI_ind(i,j) comprising, for each i-th $UE_i$/j-th $RU_j$ pair, the index referring to the corresponding associated CQI_val estimate/measure, the penalization factor P given by the values that the contextualization function $f$ takes according to the configuration of the active set, and the current buffer status variable $B_i$ (initially supposed as being equal to the value of the buffer size parameter $q_i$ of the i-th $UE_i$).

| General Configuration | |
|---|---|
| Number of $UE_i$s | 2 |
| Number of $RU_j$s | 3 |
| Number of $PRB_k$s | 2 |
| Number of Layers | 2 |

| CQI_val[CQI_ind(i, j)] | | | | | | | | | |
|---|---|---|---|---|---|---|---|---|---|
| 0 | 6 | 15 | 25 | 39 | 50 | 63 | 72 | 80 | 93 |

| CQI_ind(i, j) | | | |
|---|---|---|---|
| | $RU_1$ | $RU_2$ | $RU_3$ |
| $UE_1$ | 6 | 2 | 9 |
| $UE_2$ | 4 | 8 | 3 |

| Penalization Factor | |
|---|---|
| ($RU_1$, $RU_2$, $RU_3$) Configuration | P = f($RU_1$, $RU_2$, $RU_3$) = {$P_1$, $P_2$, $P_3$} |
| (0, 0, 1) | {0, 0, 0} |
| (0, 1, 0) | {0, 0, 0} |
| (1, 0, 0) | {0, 0, 0} |
| (0, 1, 1) | {0, 2, 2} |
| (1, 1, 0) | {2, 2, 0} |
| (1, 0, 1) | {1, 0, 1} |
| (1, 1, 1) | {3, 4, 3} |

| $B_i$ | |
|---|---|
| | $q_i$ |
| $UE_1$ | 93 |
| $UE_2$ | 130 |

For the sake of description simplicity, let be supposed that the de-contextualization function g has already been applied, thus with the indexes CQI_ind(i,j) and the values CQI_val which the indexes CQI_ind(i,j) point to that are atomic already. Under this assumption, for the two k-th $PRB_k$s to be allocated, the aCQI(i,j,k) matrix derived from the CQI_val table and the index table CQI_ind(i,j) is the following (shown as two distinct tables each one for a corresponding k-th $PRB_k$ to be allocated):

| aCQI(i, j, k = 1) | | | |
|---|---|---|---|
| | $RU_1$ | $RU_2$ | $RU_3$ |
| $UE_1$ | 63 | 15 | 93 |
| $UE_2$ | 39 | 80 | 25 |

| aCQI(i,j,k = 2) | | | |
|---|---|---|---|
| | $RU_1$ | $RU_2$ | $RU_3$ |
| $UE_1$ | 63 | 15 | 93 |
| $UE_2$ | 39 | 80 | 25 |

In order to avoid wasting radio resources, the aCQI(i,j,k) matrix is obtained after masking operation thereof, i.e. replacing of each CQI_val[CQI_ind(i,j)] (i.e. each value of the $aCQI_{i,j,k}$ element of the aCQI(i,j,k) matrix) by the minimum value between CQI_val[CQI_ind(i,j)] and the current buffer status variable $B_i$ (initially assumed as being equal to the value of the corresponding $q_i$ parameter). In the case at issue, as all the $q_i$ parameters of the UEs have values at most equal to, or even higher than each $aCQI_{i,j,k}$ element, the resulting aCQI(i,j,k) matrix after masking operation is the same as that of above.

In such condition, the $aCQI_{i,j,k}$ element of the aCQI(i,j,k) matrix having maximum CQI_val (93, in the example at issue) is that corresponding to $UE_1$,$RU_3$,$PRB_1$ (i=1, j=3, k=1). The allocation matrix T(i,j,k) is updated ($T_{1,3,1}$ equal to 1, denoting that the $PRB_1$ is allocated on the $RU_3$ for data transmission to the $UE_1$).

As the maximum CQI_val also corresponds to the maximum value as possible of CQI_val, thus the $RU_3$ was not yet transmitting to the $UE_1$. The layer $L_1$ referred to $UE_1$ is decreased by one unit ($L_1$=1).

Then, the scheduling algorithm updates the current buffer status variable $B_i$ according to the current status of the aCQI(i,j,k) matrix, i.e. by considering the maximum between 0 (indicating no available buffer size is provided for handling data, i.e. full buffer) and the remaining available buffer size (obtained by decreasing the data till that moment provided from the buffer size parameter $q_i$), namely:

$B_1$=max(0,$q_1$−$T_{1,3,1}$*CQI_val[CQI_$ind_{1,3}$]=93−93)=0
$B_2$=max(0,$q_2$)=130

Then, $aCQI_{1,3,1}$=$aCQI_{2,3,1}$ is zeroed (as the $PRB_1$ has been allocated on the $RU_3$ for data transmission to the $UE_1$, and hence allocation of the $PRB_1$ itself on the $RU_3$ for data transmission to the $UE_2$ is avoided), whereas no zeroing of the row of the $UE_1$ is performed as the layers are not saturated.

Then, for each $aCQI_{i,j,k}$ element to be updated, the penalization factor P is calculated/retrieved for the active set comprising the scheduled RU and the RU corresponding to the $aCQI_{i,j,k}$ element to be updated, and interference model is then applied for updating.

$$aCQI_{1,1,1} \begin{cases} P = f(1, 0, 1) = \{1, 0, 1\} = \{P_1, P_2, P_3\} \\ aCQI_{1,1,1} = \max(0, CQI\_val[CQI\_ind_{1,1} - P_1] + \\ T_{1,3,1} * CQI\_val[CQI\_ind_{1,3} - P_3] - T_{1,3,1} * CQI\_val \\ [CQI\_ind_{1,3} - P_2]) = \max(0, 50 + 80 - 93) = 27 \end{cases}$$

$$aCQI_{1,2,1} \begin{cases} P = f(0, 1, 1) = \{0, 2, 2\} = \{P_1, P_2, P_3\} \\ aCQI_{1,2,1} = \max(0, CQI\_val[CQI\_ind_{1,2} - P_2] + \\ T_{1,3,1} * CQI\_val[CQI\_ind_{1,3} - P_3] - T_{1,3,1} * CQI\_val \\ [CQI\_ind_{1,3} - P_1]) = \max(0, 0 + 72 - 93) = 0 \end{cases}$$

$$aCQI_{2,1,1} \begin{cases} P = f(1, 0, 1) = \{1, 0, 1\} = \{P_1, P_2, P_3\} \\ aCQI_{2,1,1} = \max(0, CQI\_val[CQI\_ind_{2,1} - P_1] + \\ T_{1,3,1} * CQI\_val[CQI\_ind_{1,3} - P_3] - T_{1,3,1} * CQI\_val \\ [CQI\_ind_{1,3} - P_2]) = \max(0, 25 + 80 - 93) = 12 \end{cases}$$

$$aCQI_{2,2,1} \begin{cases} P = f(0, 1, 1) = \{0, 2, 2\} = \{P_1, P_2, P_3\} \\ aCQI_{2,2,1} = \max(0, CQI\_val[CQI\_ind_{2,2} - P_2] + \\ T_{1,3,1} * CQI\_val[CQI\_ind_{1,3} - P_3] - T_{1,3,1} * CQI\_val \\ [CQI\_ind_{1,3} - P_1]) = \max(0, 63 + 72 - 93) = 42 \end{cases}$$

Thus, the updated aCQI(i,j,k) matrix is the following:

| aCQI(i,j,k = 1) | | | |
| --- | --- | --- | --- |
| | $RU_1$ | $RU_2$ | $RU_3$ |
| $UE_1$ | 37 | 0 | 0 |
| $UE_2$ | 12 | 42 | 0 |

| aCQI(i,j,k = 2) | | | |
| --- | --- | --- | --- |
| | $RU_1$ | $RU_2$ | $RU_3$ |
| $UE_1$ | 63 | 15 | 93 |
| $UE_2$ | 39 | 80 | 25 |

As the aCQI(i,j,k) matrix is not yet zeroed, the scheduling algorithm is reiterated for a new scheduling decision.

In this case, the $aCQI_{i,j,k}$ element of the ACM matrix having maximum CQI_val (i.e. 80, after masking of the aCQI(i,j,k) matrix with the current buffer status variable, as before) is that corresponding to $UE_2, RU_2, PRB_2$ (i=2, j=2, k=2). The allocation matrix T(i,j,k) is updated ($T_{2,2,2}$ equal to 1, denoting that the $PRB_2$ is allocated on the $RU_2$ for data transmission to the $UE_2$).

The layer $L_2$ referred to $UE_2$ is decreased by one unit ($L_2$=1).

As before, the scheduling algorithm then updates the current buffer status variable $B_i$, namely:

$B_1$=0 (as before)
$B_2$=max(0,$q_2$−$T_{2,2,2}$*CQI_VAL[$CQI_{2,2}$])=max(0,130−80)=50

Then, $aCQI_{2,2,2}$=$aCQI_{1,2,2}$ is zeroed (as the $PRB_2$ has been allocated on the $RU_2$ for data transmission to the $UE_2$, and hence allocation of the $PRB_2$ itself on the $RU_2$ for data transmission to the $UE_1$ is avoided), whereas no zeroing of the row of the $UE_2$ is performed as the layers are not saturated.

Then, for each $aCQI_{i,j,k}$ element to be updated, the corresponding penalization factor P is calculated/retrieved, and interference model is hence applied for updating:

$$aCQI_{1,1,2} \begin{cases} P = f(1, 1, 0) = \{2, 2, 0\} = \{P_1, P_2, P_3\} \\ aCQI_{1,1,2} = \max(0, CQI\_val[CQI\_ind_{1,1} - P_1] + \\ T_{2,2,2} * CQI\_val[CQI\_ind_{2,2} - P_2] - T_{2,2,2} * CQI\_val \\ [CQI\_ind_{2,2} - P_3]) = \max(0, 39 + 63 - 80) = 22 \end{cases}$$

$$aCQI_{2,1,1} \begin{cases} P = f(1, 1, 0) = \{2, 2, 0\} = \{P_1, P_2, P_3\} \\ aCQI_{2,1,1} = \max(0, CQI\_val[CQI\_ind_{2,1} - P_1] + \\ T_{2,2,2} * CQI\_val[CQI\_ind_{2,2} - P_2] - T_{2,2,2} * CQI\_val \\ [CQI\_ind_{2,2} - P_3]) = \max(0, 15 + 63 - 80) = 0 \end{cases}$$

$$aCQI_{1,3,1} \begin{cases} P = f(0, 1, 1) = \{0, 2, 2\} = \{P_1, P_2, P_3\} \\ aCQI_{1,3,1} = \max(0, CQI\_val[CQI\_ind_{1,3} - P_3] + \\ T_{2,2,2} * CQI\_val[CQI\_ind_{2,2} - P_2] - T_{2,2,2} * CQI\_val \\ [CQI\_ind_{2,2} - P_1]) = \max(0, 72 + 63 - 80) = 55 \end{cases}$$

$$aCQI_{2,3,1} \begin{cases} P = f(0, 1, 1) = \{0, 2, 2\} = \{P_1, P_2, P_3\} \\ aCQI_{2,3,1} = \max(0, CQI\_val[CQI\_ind_{2,3} - P_3] + \\ T_{2,2,2} * CQI\_val[CQI\_ind_{2,2} - P_2] - T_{2,2,2} * CQI\_val \\ [CQI\_ind_{2,2} - P_1]) = \max(0, 6 + 63 - 80) = 0 \end{cases}$$

Thus, the updated aCQI(i,j,k) matrix is the following:

| aCQI(i,j,k = 1) | | | |
| --- | --- | --- | --- |
| | $RU_1$ | $RU_2$ | $RU_3$ |
| $UE_1$ | 37 | 0 | 0 |
| $UE_2$ | 12 | 42 | 0 |

| aCQI(i,j,k = 2) | | | |
| --- | --- | --- | --- |
| | $RU_1$ | $RU_2$ | $RU_3$ |
| $UE_1$ | 22 | 0 | 55 |
| $UE_2$ | 0 | 0 | 0 |

As the updated aCQI(i,j,k) matrix is not yet zeroed, the scheduling algorithm is reiterated for a new scheduling decision.

In this case, the $aCQI_{i,j,k}$ element of the aCQI(i,j,k) matrix having maximum CQI_val (i.e. 42, after masking of the aCQI(i,j,k) matrix with the current buffer status variable) is that corresponding to $UE_2, RU_2, PRB_1$ (i=2, j=2, k=1). The allocation matrix T(i,j,k) is updated ($T_{2,2,1}$ equal to 1), whereas the layer $L_2$ referred to $UE_2$ is unchanged as $RU_2$ already transmits to $UE_2$.

Then, the scheduling algorithm updates the current buffer status variable $B_i$ according to the current status of the aCQI(i,j,k) matrix. In this case, the buffer $B_1$ does not empty, as $RU_2$ spatially interferes with the $RU_3$ on the $PRB_1$—thus, with penalization factor equal to $P_3$=2 (P=$f$(0, 1, 1)={0, 2, 2}={$P_1, P_2, P_3$}), namely:

$B_1 = \max(0, q_1 - T_{1,3,1}*CQI\_val[CQI\_ind_{1,3} - P_3]) = \max(0, 93-72) = 21$, whereas the buffer $B_2$ can be calculated as usual:

$B_2 = \max(0, q_2 - T_{2,2,1}*CQI\_val[CQI\_ind_{2,2} - P_2]) = \max(0, 130-80-63) = 0$.

Then, $aCQI_{2,2,1} = aCQI_{1,2,1}$ is zeroed, the penalization factors are calculated/retrieved and interference model is hence applied for updating the $aCQI_{i,j,k}$ elements of the aCQI(i,j,k) matrix. The resulting matrix is the following:

| aCQI(i,j,k = 1) | | | |
|---|---|---|---|
| | $RU_1$ | $RU_2$ | $RU_3$ |
| $UE_1$ | 0 | 0 | 0 |
| $UE_2$ | 0 | 0 | 0 |

| aCQI(i,j,k = 2) | | | |
|---|---|---|---|
| | $RU_1$ | $RU_2$ | $RU_3$ |
| $UE_1$ | 22 | 0 | 55 |
| $UE_2$ | 0 | 0 | 0 |

As the updated aCQI(i,j,k) matrix is not yet zeroed, the scheduling algorithm is reiterated for another scheduling decision.

In this case, the $aCQI_{i,j,k}$ element of the aCQI(i,j,k) matrix having maximum CQI_val (i.e. 55, after masking of the aCQI(i,j,k) matrix with the current buffer status) is that corresponding to $UE_1, RU_3, PRB_2$ (i=1, j=3, k=2). The allocation matrix T(i,j,k) is updated ($T_{1,3,2}$ equal to 1), whereas the layer $L_2$ referred to $UE_2$ is unchanged as the $RU_3$ already transmitted to $UE_1$.

Then, the scheduling algorithm updates the current buffer status variable $B_i$. In this case, the buffer $B_2$ does not empty, as $RU_2$ interferes with the $RU_3$ on the $PRB_2$ (thus, with penalization factor equal to 2), namely:

$B_2 = \max(0, 130-80-63) = 0$.

whereas the buffer $B_1$ is $B_1 = \max(0, 93-72-72) = 0$.

Then, $aCQI_{1,3,2} = aCQI_{2,3,2}$ is zeroed, the penalization factors are calculated/retrieved and interference model is hence applied for updating the $aCQI_{i,j,k}$ elements of the aCQI(i,j,k) matrix. At this point, the matrix is empty and the scheduling algorithm ends and provides the allocation matrix illustrated below:

| T(i,j,k = 1) | | | |
|---|---|---|---|
| | $RU_1$ | $RU_2$ | $RU_3$ |
| $UE_1$ | 0 | 0 | 1 |
| $UE_2$ | 0 | 1 | 0 |

| T(i,j,k = 2) | | | |
|---|---|---|---|
| | $RU_1$ | $RU_2$ | $RU_3$ |
| $UE_1$ | 0 | 0 | 1 |
| $UE_2$ | 0 | 1 | 0 |

FIG. 4 schematically shows a flow chart illustrating a sequence of operations of a scheduling algorithm 420 of the scheduling procedure according to another embodiment of the present invention.

The scheduling algorithm 420 starts at the black start circle, then reaches the decision block 425, wherein a test is executed for checking whether the aCQI(i,j,k) matrix has at least one index triple (i,j,k) such that the corresponding $aCQI_{i,j,k}$ element is different from zero. In the affirmative case, exit branch Y of the decision block 425, the scheduling algorithm 420 starts a scheduling cycle for scheduling the $UE_i$, $RU_j$ and $PRB_k$ whose current buffer status variable $B_i$ has minimum value; more particularly, during each scheduling cycle, the scheduling algorithm 420 selects an index triple (i,j,k), updates (block 430) the corresponding $T_{i,j,k}$ element of the allocation matrix T(i,j,k) (e.g., by setting it at "1"), and calculates (block 435) the current buffer status variable $B_i$ (e.g., through the aCQI(i,j,k) matrix and the penalization factor like before) by assuming that the $aCQI_{i,j,k}$ element corresponding to the selected index triple (i,j,k) is used for transmission.

Then, the scheduling algorithm 420 reaches the decision block 440, wherein a test is executed for checking whether the selected index triple (i,j,k) is the best choice (for scheduling). In order to check that, any proper criterion may be used, such as throughput maximization and the like; in such case, the decision block 440 is configured for checking minimum $B_i$, e.g., by comparing the value $B_i$ corresponding to the selected index triple (i,j,k) with the value $B_i$ corresponding to the (saved) index triple (i,j,k) that during a previous scheduling cycle has been identified as having minimum $B_i$ (as before, computing/updating of the current buffer status variable $B_i$ of the scheduled UE comprises decreasing the buffer size parameter $q_i$ of the scheduled UE by actual amount of data already served to the corresponding user equipment buffer, said actual amount of data taking into account mutual interference among the active set by means of the corresponding penalization factor).

In the affirmative case, exit branch Y of the decision block 440, at block 445 the scheduling algorithm 420 saves the (i,j,k) index triple—and stores the corresponding new aCQI (i,j,k) matrix configuration—that, by said comparison, has been found as determining the lowest value of $B_i$ (in fact, as $B_i$ represents data in queue to the i-th UE, low values of $B_i$ correspond to high data transmission, whereas high values of $B_i$ correspond to low data transmission), thereby reaching the block 450 (wherein the $T_{i,j,k}$ element of the allocation matrix T(i,j,k) is set at e.g. "0" and the value $T_{i,j,k}=0$ is saved); otherwise, exit branch N of the decision block 440, the scheduling algorithm directly jumps to block 450.

The operations of the blocks 430-450 are reiterated as long as the scheduling cycle has not selected all the other index triples (i,j,k) and compared the values $B_i$ thereof with the current maximum value $B_i$. In this respect, at the decision block 455 the scheduling algorithm 420 checks whether all the index triples (i,j,k) have been considered (index triples (i,j,k) ended). In the affirmative case, exit branch Y of the decision block 455, the scheduling algorithm 420 sets at 1 the $T_{i,j,k}$ element of the allocation matrix T(i,j,k) corresponding to the index triple (i,j,k) that has determined the lowest value of $B_i$ (block 460)—and, as before, updates the number of active layers for the scheduled UE—whereas in the negative case, exit branch N of the decision block 455, the scheduling algorithm 420 returns to block 430 for a new iterations of the scheduling cycle until all the available index triples (i,j,k) have been considered.

Thus, after all the iterations of the scheduling cycle, the scheduled i-th UE, j-th RU, and k-th PRB are available at block 460. At this point, in a similar manner as the scheduling algorithm of above, the scheduling algorithm 420 updates the aCQI(i,j,k) matrix (block 465), e.g. by zeroing the $aCQI_{i,j,k}$ elements related to the scheduled RU for the scheduled PRB (i.e., the column of the aCQI(i,j,k) matrix related to the scheduled RU on the scheduled $PRB_k$), by updating the $aCQI_{i,j,k}$ elements (different from zero) of each not-scheduled $UE_i$, $RU_j$ and $PRB_k$, and, if necessary (layers ended for the scheduled $UE_i$), by zeroing the row of the aCQI(i,j,k) matrix related to the scheduled $UE_i$. As before, the updating of the each $aCQI_{i,j,k}$ element comprises applying to it a penalization factor P indicative of the interference that would occur if the j-th $RU_j$ of the active set determined by the current scheduling decision transmitted, and updating the current $aCQI_{i,j,k}$ elements by penalizing them (by means of the determined penalization factor P) taking into account both its own interference and the interference induced on the $RU_j$s activated before it.

The updated aCQI(i,j,k) matrix is hence used for data transmission, and forms the new basis for the next scheduling decision. In this respect, the scheduling algorithm 420 is reiterated until the aCQI(i,j,k) matrix has been zeroed (in fact, as visible in the figure, the scheduling algorithm 420 from block 465 returns to block 425, and hence ends to the double end circle once the aCQI(i,j,k) matrix has been zeroed (exit branch N of the decision block 425).

A practical example of the scheduling algorithm above discussed is herein disclosed.

Let be considered the same scenario assumed for illustrating the scheduling algorithm of the previous embodiment, but differently from the latter, the values of the buffers are those critical ($q_1$=85; $q_2$=143). The steps of the scheduling algorithm 420 are herein briefly illustrated.

First, starting from $B_1$=0, $B_2$=0, the following matrix is obtained:

| $T_{1,1,1} = 1$ | |
|---|---|
| | $B_i$ |
| $UE_1$ | 63 |
| $UE_2$ | 0 |

| $T_{1,2,1} = 1$ | |
|---|---|
| | $B_i$ |
| $UE_1$ | 15 |
| $UE_2$ | 0 |

| $T_{1,3,1} = 1$ | |
|---|---|
| | $B_i$ |
| $UE_1$ | 85 |
| $UE_2$ | 0 |

| $T_{1,1,2} = 1$ | |
|---|---|
| | $B_i$ |
| $UE_1$ | 63 |
| $UE_2$ | 0 |

| $T_{1,2,2} = 1$ | |
|---|---|
| | $B_i$ |
| $UE_1$ | 15 |
| $UE_2$ | 0 |

| $T_{1,3,2} = 1$ | |
|---|---|
| | $B_i$ |
| $UE_1$ | 85 |
| $UE_2$ | 0 |

| $T_{2,1,1} = 1$ | |
|---|---|
| | $B_i$ |
| $UE_1$ | 0 |
| $UE_2$ | 39 |

| $T_{2,2,1} = 1$ | |
|---|---|
| | $B_i$ |
| $UE_1$ | 0 |
| $UE_2$ | 80 |

| $T_{2,3,1} = 1$ | |
|---|---|
| | $B_i$ |
| $UE_1$ | 0 |
| $UE_2$ | 25 |

| $T_{2,1,2} = 1$ | |
|---|---|
| | $B_i$ |
| $UE_1$ | 0 |
| $UE_2$ | 39 |

| $T_{2,2,2} = 1$ | |
|---|---|
| | $B_i$ |
| $UE_1$ | 0 |
| $UE_2$ | 80 |

| $T_{2,3,2} = 1$ | |
|---|---|
| | $B_i$ |
| $UE_1$ | 0 |
| $UE_2$ | 25 |

The best configuration is $T_{1,3,1}=1$, hence the $PRB_1$ is assigned, the corresponding row of the $aCQI_{1,3,1}$ element is deleted and $B_1=85$, $B_2=0$ are considered:

| $T_{1,1,1} = 1$ | |
|---|---|
| | $B_i$ |
| $UE_1$ | 85 |
| $UE_2$ | 0 |

| $T_{1,2,1} = 1$ | |
|---|---|
| | $B_i$ |
| $UE_1$ | 72 |
| $UE_2$ | 0 |

| $T_{1,1,2} = 1$ | |
|---|---|
| | $B_i$ |
| $UE_1$ | 85 |
| $UE_2$ | 0 |

| $T_{1,2,2} = 1$ | |
|---|---|
| | $B_i$ |
| $UE_1$ | 85 |
| $UE_2$ | 0 |

| $T_{1,3,2} = 1$ | |
|---|---|
| | $B_i$ |
| $UE_1$ | 85 |
| $UE_2$ | 0 |

| $T_{2,1,1} = 1$ | |
|---|---|
| | $B_i$ |
| $UE_1$ | 80 |
| $UE_2$ | 25 |

| $T_{2,2,1} = 1$ | |
|---|---|
| | $B_i$ |
| $UE_1$ | 72 |
| $UE_2$ | 63 |

| $T_{2,1,2} = 1$ | |
|---|---|
| | $B_i$ |
| $UE_1$ | 85 |
| $UE_2$ | 39 |

| $T_{2,2,2} = 1$ | |
|---|---|
| | $B_i$ |
| $UE_1$ | 85 |
| $UE_2$ | 80 |

| $T_{2,3,2} = 1$ | |
|---|---|
| | $B_i$ |
| $UE_1$ | 85 |
| $UE_2$ | 25 |

The best configuration is $T_{2,2,2}=1$, hence the $PRB_1$ is assigned, the corresponding row of the $aCQI_{2,2,2}$ element is deleted and $B_1=85$, $B_2=80$ are considered:

| $T_{1,1,1} = 1$ | |
|---|---|
| | $B_i$ |
| $UE_1$ | 85 |
| $UE_2$ | 80 |

| $T_{1,2,1} = 1$ | |
|---|---|
| | $B_i$ |
| $UE_1$ | 72 |
| $UE_2$ | 80 |

| $T_{1,1,2} = 1$ | |
|---|---|
| | $B_i$ |
| $UE_1$ | 85 |
| $UE_2$ | 63 |

| $VT_{1,3,2} = 1$ | |
|---|---|
| | $B_i$ |
| $UE_1$ | 85 |
| $UE_2$ | 63 |

| $T_{2,1,1} = 1$ | |
|---|---|
| | $B_i$ |
| $UE_1$ | 80 |
| $UE_2$ | 105 |

| $T_{2,2,1} = 1$ | |
|---|---|
| | $B_i$ |
| $UE_1$ | 72 |
| $UE_2$ | 143 |

| $T_{2,1,2} = 1$ | |
|---|---|
| | $B_i$ |
| $UE_1$ | 85 |
| $UE_2$ | 78 |

| $T_{2,3,2} = 1$ | |
|---|---|
| | $B_i$ |
| $UE_1$ | 85 |
| $UE_2$ | 69 |

The best configuration is $T_{2,2,1}=1$, hence the $PRB_1$ is assigned, the corresponding row of the $aCQI_{2,2,1}$ element is deleted and $B_1=72$, $B_2=143$ are considered:

| $T_{1,1,1} = 1$ | |
|---|---|
| | $B_i$ |
| $UE_1$ | 85 |
| $UE_2$ | 119 |

| $T_{1,1,2} = 1$ | |
|---|---|
| | $B_i$ |
| $UE_1$ | 85 |
| $UE_2$ | 126 |

| $T_{1,3,2} = 1$ | |
|---|---|
| | $B_i$ |
| $UE_1$ | 85 |
| $UE_2$ | 126 |

| $T_{2,1,1} = 1$ | |
|---|---|
| | $B_i$ |
| $UE_1$ | 63 |
| $UE_2$ | 125 |

| $T_{2,1,2} = 1$ | |
|---|---|
| | $B_i$ |
| $UE_1$ | 72 |
| $UE_2$ | 141 |

| $T_{2,3,2} = 1$ | |
|---|---|
| | $B_i$ |
| $UE_1$ | 72 |
| $UE_2$ | 132 |

As no better configuration has been found, the scheduling algorithm ends. Therefore, the buffers of $UE_1$ and $UE_1$ can be emptied down to the values of, respectively:

$$q_1=85-72=13$$

$$q_2=143-143=0$$

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

For example, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

Moreover, although the common principles of the scheduling algorithms of the present invention have been described as applying to wireless communication networks comprising DAS systems, this should not be construed limitatively; in fact, the described scheduling algorithms may be conceptually used, without substantial changes and without departing from the scope of the present invention, to many other communication networks configurations that, although unprovided with the DAS system, involve similar problem formulations in terms of resource allocation. In this respect, the Applicant has also investigated communication networks implementing carrier aggregation, and (as will be briefly described in the following) has found that the latter has to be considered as a particular sub-case of the (generic) DAS problem herein disclosed, which makes the scheduling algorithms developed for communication network provided with DAS systems fully applicable to carrier aggregation context as well.

In fact, as briefly discussed in the introductory part of the present description, carrier aggregation for achieving bandwidth extension is a key enhancement feature of LTE-Advanced.

By using a similar notation of that of above, in LTE-Advanced each UE report its perceived downlink channel state to eNodeB scheduler as the $CQI_{i,j}$ value, which determines the Transmission Block Size (TBS) that the eNodeB should use, i.e., indirectly, the number of bits per PRB.

A single $UE_i$ may receive transmissions from different $RU_j$s on a same time-frequency resource. In fact, such transmissions are spatially separated, and can therefore be reconstructed at the $UE_i$ with a sufficiently high probability. In this respect, each $UE_i$ is able to decode simultaneously a maximum number of spatially separated layers (that may be smaller or larger than the number of $RU_j$s that can target it at a given TTI), whereas the number of layers that the channel may support simultaneously changes over time (and is estimated by the $UE_i$ and reported to the eNodeB scheduler as a Rank Indicator, or RI). Hence, at a given TTI, the $UE_i$ may receive up to RI spatially separated layers.

The scheduler coordinates $j=1, 2, \ldots M$ distributed $RU_j$s, hence builds up to M frames. Each $RU_j$ transmits a frame of $k=1, 2, \ldots B_j$ $PRB_k$s. The network cell provides service for $i=1, 2, \ldots N$ $UE_i$s, and let be denoted by $q_i$ the backlog (physically queued at the eNodeB) destined to $UE_i$ ("UE backlog", to be distinguished from idle and backlogged $UE_i$s accordingly). Each $UE_i$ can receive data from up to $k_i$ $RU_j$s simultaneously, wherein $k_i$ represents the RI reported by the $UE_i$. Let be denoted by $K=\Sigma_{i=1}^{N}k_i$ the total number of exploitable layers at a given time, by $CQI_{i,j}$ the number of bytes that the j-th $RU_j$ will put in a $PRB_k$ destined to the i-th $UE_i$, and by $x_{i,j}$ the number of $PRB_k$s allocated by j-th $RU_j$ to the i-th $UE_i$. Let be also assumed that the TBS increases linearly with the number of PRBs employed to compute it, so that $CQI_{i,j}*x_{i,j}$ the overall number of bytes that the i-th $UE_i$ receives from the j-th $RU_j$.

Under the assumptions of above, the object of computing, on each TTI, the resource allocation that ensures optimal throughput can be formulated as follows:

$$\max \Sigma_{i=1}^{N}\Sigma_{j=1}^{M}(CQI_{i,j}\cdot x_{i,j}-p_{i,j})$$

s.t.

$$\Sigma_{j=1}^{M}(CQI_{i,j}\cdot x-p_{i,j})\leq q_i \forall i \quad \text{(i)}$$

$$p_{i,j}\leq CQI_{i,j}-1 \forall i,j \quad \text{(ii)}$$

$$\Sigma_{i=1}^{N}x_{i,j}\leq B_j \forall j \quad \text{(iii)}$$

$$\Sigma_{j=1}^{M}b_{i,j}23\ k_i \forall i \quad \text{(iv)}$$

$$x_{i,j}\geq b_{i,j}550\ i,j \quad \text{(v)}$$

$$x_{i,j}\leq b_{i,j}\cdot B \forall i,j \quad \text{(vi)}$$

$$b_{i,j}\in[0,1], p_{i,j}x_{i,j}\in Z^+\forall i,j \quad \text{(vii)}$$

The following modeling variables are introduced:
$p_{i,j}$: the padding received by the i-th $UE_i$ from the j-th $RU_j$, due to the fact that $PRB_k$s contain a fixed number of bytes. Obviously, padding has to be discounted from objective function, in order to avoid entire frames being allocated to idle $UE_i$s with high $CQI_{i,j}$.
$b_{i,j}$: a binary variable stating that j-th $RU_j$ is serving the i-th $UE_i$.

Constraint (i) ensures that each $UE_i$ receives no more $PRB_k$s than needed to clear its backlog, whereas constraint (ii) prevents the scheduler to allocate entire $PRB_k$s of padding. On the other hand, constraint (iii) enforces the limit on the frame length for each $RU_j$. Constraint (iv) relates to the maximum number of simultaneous layers, whereas constraints (v-vi) force $x_{i,j}$ to be positive if $b_{i,j}=1$, and null otherwise. B is a constant such that $B\geq B_j \forall j$, so that constraint (vi) is inactive when $b_{i,j}=1$.

In a carrier aggregation enabled cell, LTE $UE_i$s may receive transmissions on different carriers on different time-frequency resource, while LTE-Advanced $UE_i$s may receive transmission on multiple carriers during the same TTI.

An LTE-Advanced $UE_i$ can decode simultaneously data from all of the available carriers at a given TTI. The scheduler coordinates M carriers, hence builds M frames. On each carrier j a frame of $B_j$ PRBs is transmitted. The cell provides service for $i=1, 2, N$ $UE_i$s, and let $q_i$ denote the backlog (physically queued at the eNodeB) destined to the i-th $UE_i$. An LTE-Advanced $UE_i$ can receive data from all $RU_j$s simultaneously. Let be denoted by $K=\Sigma_{i=1}^{N}k_i$ the total number of exploitable carriers at a given time, by $CQI_{i,j}$ the number of bytes that the eNodeB will put in a $PRB_k$ of carrier j destined to the i-th $UE_i$, and by $x_{i,j}$ the number of $PRB_k$s allocated on carrier j to the i-th $UE_i$. Let be also assumed that the TBS increases linearly with the number of $PRB_k$s employed to compute it, so that $CQI_{i,j}*x_{i,j}$ is the overall number of bytes that the i-th $UE_i$ receives on carrier j.

Under definitions and assumptions of above, the carrier aggregation-aware version of the optimal-throughput problem can be formulated as follows:

$$\max \Sigma_{i=1}^{N}\Sigma_{j=1}^{M}(CQI_{i,j}\cdot x_{i,j}-p_{i,j})$$

s.t.

$$\Sigma_{j=1}^{M}(CQI_{i,j}\cdot x_{i,j}-p_{i,j})\leq q_i \forall i \quad \text{(i)}$$

$$p_{i,j}\leq CQI_{i,j}-1 \forall i,j \quad \text{(ii)}$$

$$\Sigma_{i=1}^{N}x_{i,j}\leq B_j \forall j \quad \text{(iii)}$$

$$\Sigma_{j=1}^{M}b_{i,j}\leq k_i \forall i \quad \text{(iv)}$$

$$x_{i,j}\geq n_{i,j}\forall i,j \quad \text{(v)}$$

$$x_{i,j}\leq b_{i,j}\cdot B \forall i,j \quad \text{(vi)}$$

$$b_{i,j}\in[0,1], p_{i,j}x_{i,j}\in Z^+\forall i,j \quad \text{(vii)}$$

The following modeling variables are introduced:
$p_{i,j}$: the padding received by the i-th $UE_i$ on carrier j, due to the fact that $PRB_k$s contain a fixed number of bytes. Obviously, padding has to be discounted from the objective function, in order to avoid entire frames being allocated to idle $UE_i$s with high $CQI_{i,j}$.

$b_{i,j}$: a binary variable stating that carrier j carries data for the i-th $UE_i$.

Constraint (i) ensures that each $UE_i$ receives no more $PRB_k$s than needed to clear its backlog, whereas constraint (ii) prevents the scheduler to allocate entire $PRB_k$s of padding. On the other hand, constraint (iii) enforces the limit on the frame length for each carrier. Constraint (iv) relates to the maximum number of simultaneous carriers, whereas constraints (v-vi) force $x_{i,j}$ to be positive if $b_{i,j}=1$, and null otherwise. B is a constant such that $B \geq B_j \forall j$, so that constraint (vi) is inactive when $b_{i,j}=1$.

Therefore, as visible by comparing the analytic formulations of above, the DAS-aware throughput maximization problem substantially matches the carrier aggregation-aware throughput maximization problem, thus any man skilled in the art could easily adapt the scheduling algorithms above described for the DAS system context to carrier aggregation context (hence, to any other similar context).

Although the described scheduling algorithms have been considered as substantially operating in downlink direction, this should not be understood in a restricting way. In fact, the scheduling algorithms according to the invention may be equivalently applied in the uplink direction; in this respect, in an alternative embodiment, not shown, said CQIs reported by the UEs are replaced by the channel estimation performed by eNodeB for the UEs, and the buffer size parameters in downlink transmission are replaced by the buffer size parameters in uplink transmission, available at the eNodeB thanks to the reporting of the BSR (Buffer Status Report) provided by the LTE and LTE-Advanced standards.

Moreover, nothing prevents from implementing the scheduling algorithm in such a way that the scheduling decision is based on both uplink and downlink feedback information, or any combination thereof.

In addition, analogous considerations apply if the wireless communication network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although for the present invention explicit reference has been made to wireless communication network based on the LTE-Advanced standard, it should be understood that it is not in the intentions of the Applicant to be limited to the implementation of any particular wireless communication system architecture or protocol. In this respect, it is also possible to provide that, with suitable simple modifications, the present link scheduling algorithm may be applied also to other open or proprietary communication protocols, for example, WiMAX, among them.

The invention claimed is:

1. A method for scheduling resources allocation within a wireless communications network comprising at least one network cell, the at least one network cell comprising a central unit providing coverage over the network cell and managing at least one transmission frame for putting into communication the central unit with at least one corresponding user equipment within the network cell, the method comprising:

retrieving input parameters, said input parameters comprising, for each user equipment, a channel quality parameter indicative of a measured/estimated channel quality based on actual network cell conditions;

applying a de-contextualization function to each channel quality parameter for obtaining a corresponding atomic channel quality parameter indicative of the channel quality de-contextualized from the actual network cell conditions;

performing a scheduling algorithm for providing a binary allocation matrix indicative of each scheduled physical resource block, transmission frame and user equipment, and applying a contextualization function to said allocation matrix for obtaining indication of a transport block size to be used by the scheduled transmission frame for transport blocks transmissions from or towards each scheduled user equipment, wherein said performing a scheduling algorithm comprises reiterating the scheduling algorithm until all the atomic channel quality parameters have been zeroed, said scheduling algorithm comprising, for each iteration:

for each selected user equipment, masking the atomic channel quality parameters by a current buffer status variable indicative of a current status of a buffer of the user equipment;

scheduling the user equipment, transmission frame and physical resource block whose masked atomic channel quality parameter has a maximum value;

upon each scheduling, updating the allocation matrix by setting an element of the allocation matrix corresponding to the scheduled user equipment, transmission frame and physical resource block at a first value indicative of the scheduling;

updating the current buffer status variable of the scheduled user equipment according to said scheduling;

zeroing the atomic channel quality parameters related to the scheduled transmission frame for the scheduled physical resource block, and updating each atomic channel quality parameter different from zero corresponding to the scheduled physical resource block.

2. The method according to claim 1, wherein said masking the atomic channel quality parameters comprises replacing each atomic channel quality parameter by a minimum value between the atomic channel quality parameter itself and the current buffer status variable.

3. The method according to claim 1, wherein said updating each atomic channel quality parameter different from zero corresponding to the scheduled physical resource block comprises applying to it a penalization factor indicative of an interference that would occur if the transmission frame of the current scheduling decision was transmitted, and penalizing each atomic channel quality parameter different from zero by means of the determined penalization factor.

4. The method according to claim 3, wherein the input parameters further comprise a buffer size parameter indicative of an amount of data that is buffered for each user equipment, and wherein said updating the current buffer status variable comprises decreasing each value of the current buffer status variable, initially set at the buffer size parameter, by an actual amount of data already served to the corresponding user equipment buffer, said actual amount of data taking into account mutual interference among the transmission frames by means of the respective penalization factor.

5. The method according to claim 1, wherein the input parameters further comprise a number of active transmission frames for each user equipment, and wherein the method further comprises:
   after said updating the allocation matrix, updating the number of active transmission frames for the scheduled user equipment, and
   after said zeroing the atomic channel quality parameters related to the scheduled transmission frame for the scheduled physical resource block, zeroing all the atomic channel quality parameters related to the scheduled user equipment in case the corresponding number of active transmission frames is zero.

6. The method according to claim 3, wherein the contextualization function is zero when no mutual interference between the transmission frames is present, constant when each transmission frame is supposed to induce a constant interference factor to all the other transmission frames, and proximity-based when each transmission frame is supposed to induce a constant interference factor to neighboring transmission frames.

7. The method according to claim 4, wherein said channel quality parameter is an uplink channel quality parameter denoting an uplink channel quality evaluated in respect of the at least one user equipment and by the central unit in respect of the transmission frame, said buffer size parameter being an uplink buffer size parameter comprised, together with the uplink channel quality parameter, with a buffer size report available at a remote unit.

8. The method according to claim 4, wherein said channel quality parameter is a feedback downlink channel quality parameter denoting a downlink channel quality evaluated by each user equipment, said buffer size parameter being a downlink buffer size parameter.

9. A computer program loadable into at least one internal non-transitory memory of a computer system with input units and output units as well as with processing units, the computer program comprising executable software adapted to carry out the method phases according to claim 1 when running in the computer system.

10. A wireless communications network comprising at least one network cell, the at least one network cell comprising a central unit providing coverage over the network cell and managing at least one transmission frame for putting into communication the central unit with at least one corresponding user equipment within the network cell, wherein
   the central unit comprises a scheduler unit for
   retrieving input parameters, said input parameters comprising, for each user equipment, a channel quality parameter indicative of a measured/estimated channel quality based on actual network cell conditions;
   applying a de-contextualization function to each channel quality parameter for obtaining a corresponding atomic channel quality parameter indicative of the channel quality de-contextualized from the actual network cell conditions;
   performing a scheduling algorithm for providing a binary allocation matrix indicative of each scheduled physical resource block, transmission frame and user equipment, and
   applying a contextualization function to said allocation matrix for obtaining indication of a transport block size to be used by the scheduled transmission frame for transport blocks transmissions from or towards each scheduled user equipment;
   wherein said performing a scheduling algorithm comprises reiterating the scheduling algorithm until all the atomic channel quality parameters have been zeroed, said scheduling algorithm comprising, for each iteration:
   for each selected user equipment, masking the atomic channel quality parameters by a current buffer status variable indicative of a current status of a buffer of the user equipment;
   scheduling the user equipment, transmission frame and physical resource block whose masked atomic channel quality parameter has a maximum value;
   upon each scheduling, updating the allocation matrix by setting an element of the allocation matrix corresponding to the scheduled user equipment, transmission frame and physical resource block at a first value indicative of the scheduling;
   updating the current buffer status variable of the scheduled user equipment according to said scheduling;
   zeroing the atomic channel quality parameters related to the scheduled transmission frame for the scheduled physical resource block, and
   updating each atomic channel quality parameter different from zero corresponding to the scheduled physical resource block.

11. The wireless communications network according to claim 10, wherein the wireless communication network is a cellular communication network compliant with Long Term Evolution (LTE) Advanced standard adopting Single Carrier Frequency Division Multiple Access scheme for uplink transmission and Orthogonal Frequency Division Multiplexing Modulation Access scheme for downlink transmission, LTE or Wi-max standards.

12. The wireless communications network according to claim 10, further comprising at least one remote unit implementing a distributed antenna system for physically transmitting the at least one transmission frame, each remote unit of the distributed antenna system being coupled with the central unit through a transport medium comprising optical fibers, dedicated wires, and/or exclusive radio-frequency links, and being coupleable with each user equipment concurrently by radio links.

13. The wireless communication network according to claim 10, wherein each transmission frame is transmitted on a separate frequency band through carrier aggregation approach.

14. The method according to claim 1, wherein an atomic channel quality parameter de-contextualized from actual network cell conditions includes an atomic channel quality parameter that is not correlated with the actual network cell conditions.

15. The wireless communications network according to claim 10, wherein an atomic channel quality parameter de-contextualized from actual network cell conditions includes an atomic channel quality parameter that is not correlated with the actual network cell conditions.

16. A method for scheduling resources allocation within a wireless communications network comprising at least one network cell, the at least one network cell comprising a central unit providing coverage over the network cell and managing at least one transmission frame for putting into communication the central unit with at least one corresponding user equipment within the network cell, the method comprising:
   retrieving input parameters, said input parameters comprising, for each user equipment, a channel quality parameter indicative of a measured/estimated channel quality based on actual network cell conditions;

applying a de-contextualization function to each channel quality parameter for obtaining a corresponding atomic channel quality parameter indicative of the channel quality de-contextualized from the actual network cell conditions;

performing a scheduling algorithm for providing a binary allocation matrix indicative of each scheduled physical resource block, transmission frame and user equipment, and applying a contextualization function to said allocation matrix for obtaining indication of a transport block size to be used by the scheduled transmission frame for transport blocks transmissions from or towards each scheduled user equipment, wherein said performing a scheduling algorithm comprises iterating the scheduling algorithm until all the atomic channel quality parameters have been zeroed, said scheduling algorithm comprising, for each iteration:

selecting a user equipment, transmission frame and physical resource block whose atomic channel quality parameter is different from zero;

for each selected user equipment, updating a current buffer status variable indicative of a current status of a buffer of the selected user equipment;

scheduling the user equipment, a remote unit and physical resource block whose current buffer status variable has a minimum value;

upon each scheduling, updating the allocation matrix by setting an element of the allocation matrix corresponding to the scheduled user equipment, transmission frame and physical resource block at a first value indicative of the scheduling;

zeroing the atomic channel quality parameters related to the scheduled transmission frame for the scheduled physical resource block, and updating each atomic channel quality parameter different from zero corresponding to the scheduled physical resource block.

* * * * *